United States Patent [19]

Haraguchi et al.

[11] 4,361,391
[45] Nov. 30, 1982

[54] FILM MAGAZINE HOLDING DEVICE FOR CAMERA

[75] Inventors: Shosuke Haraguchi; Ryoichi Yoshikawa, both of Yokohama, Japan

[73] Assignee: Canon Kabushiki Kaisha, Tokyo, Japan

[21] Appl. No.: 282,606

[22] Filed: Jul. 13, 1981

[30] Foreign Application Priority Data

Jul. 17, 1980 [JP] Japan .......................... 55-101883[U]

[51] Int. Cl.³ ............................................ G03B 17/30
[52] U.S. Cl. .................................. 354/288; 354/275
[58] Field of Search ............... 354/202, 288, 275, 212; 352/78 R, 72

[56] References Cited

U.S. PATENT DOCUMENTS 3,276,341 10/1966 Kremp et al. ...................... 354/212

Primary Examiner—L. T. Hix
Assistant Examiner—Alan Mathews
Attorney, Agent, or Firm—Toren, McGeady & Stanger

[57] ABSTRACT

A film magazine holding device for a camera wherein the film magazine loading chamber is provided with a spring member for pushing the film magazine against the upper surface or the lower surface of the loading chamber so as to prevent the opening in the film magazine, through which the film is drawn out of the magazine, from being brought out of a determined position in the opened and the closed state of the back cover.

5 Claims, 9 Drawing Figures (a)     (b)

ard391

FILM MAGAZINE HOLDING DEVICE FOR CAMERA

BACKGROUND OF THE INVENTION

1. Field of the Invention

The present invention relates to a film magazine holding device for a camera for holding a film magazine at a certain determined position in the loading chamber of the camera.

2. Description of the Prior Art

In the case of a still picture camera which utilizes 35 mm film, the film magazine in which film with a certain determined length is wound is loaded in the film magazine loading chamber when it is to be used. The film in the film magazine is drawn out through an opening in the magazine to an appropriate length to enable it to be wound on the spool of the camera. Thus, the film magazine loaded in the loading chamber in the camera is urged due to a spring effect of the film along a direction in which the opening in the magazine is away from an aperture in the camera. Consequently, when the back cover is closed with the film magazine having been somewhat rotated out of a determined position, the opening in the film magazine held by means of the film magazine holding member provided at the side of the back cover is somewhat rotated in such a manner that greater strength is needed to draw the film out of the magazine. As a result, the surface of the film may be damaged and it becomes inconvenient to operate the camera.

FIG. 1 shows the somewhat rotated state of the film magazine. In the drawing the back cover 3 is closed and the opening 2a of a film magazine 2 in a magazine loading chamber 1 is rotated into a position shown in a rigid line due to the spring effect of the film. In this state the film magazine 2 is held by means of a film magazine holding member 3a provided on the back cover 3, whereby the film opening 2a has been somewhat displaced. The dotted line in the drawing shows the correct position of the film opening. Consequently, the film 4 can not be wound smoothly on a spool 8 in the spool chamber 7 over a sprocket 6 through an aperture 5.

In view of the above-mentioned shortcomings, it is a object of the present invention to prevent the rotation of the film magazine by providing film magazine holding means in the film magazine chamber.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE PREFERRED EMBODIMENT

Figure 1:
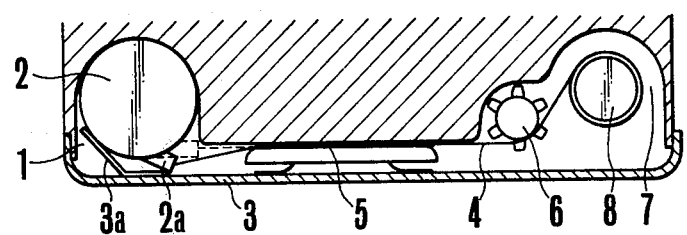
FIG. 1 shows a conventional film magazine holding device for a camera.
Figure 2:
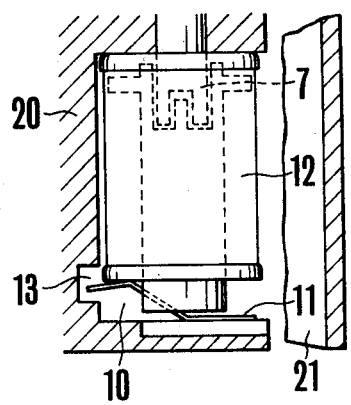
FIG. 2 is a side view of an embodiment of a film magazine holding device in accordance with the present invention.
Figure 3:
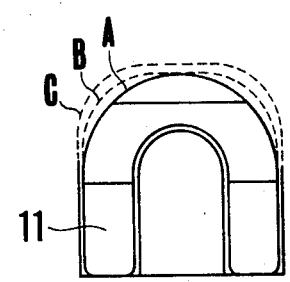
FIG. 3 is a plan view of the film holding device shown in FIG. 2.

An embodiment of the present invention will be explained in accordance with the accompanying drawings wherein FIG. 2 shows the film magazine holding device. In the drawing, 20 is a camera body and 21 is a back cover. 10 is a film magazine loading chamber provided in the camera body and 11 is a U-shaped plate spring operating as the holding member secured on the lower part of the film loading chamber 10, and serving to push the film magazine 12 upwardly. In this way the film magazine 12 is positioned in the film loading chamber 10. 13 is a groove provided in the lower part of the film loading chamber 10. Rigid line A shown in FIG. 3 represents the shape of the internal wall of the film loading chamber 10, and a dotted line B represents the shape of the plate spring 11, with the shape of the groove 13 in the film magazine loading chamber being represented by a dotted line C.

Figure 4:
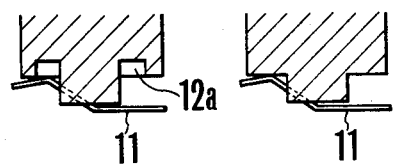
FIGS. 4(a) and (b) show the lower end of the film magazine and the contact state of the spring of the holding space.

FIGS. 4(a) and (b) show the section of the lower part of the film magazine and the contact state of the holding plate spring 11. Generally, there is a concave portion 12a formed in the lower part of the film magazine as is shown in the drawing. As shown at B in FIG. 3, the end of the plate spring 11 is made larger than the lower part A of the film magazine 12 so that the plate spring 11 is not pressed into the concave portion 12a of the film magazine but is instead pressed against the circumference of the magazine. Because in this way the end of the plate spring 11 is brought farther into the camera body beyond the internal wall of the film magazine loading chamber 10, the loading chamber 10 is provided with the concave portion 13 into which the end of the plate spring 11 can extend. In this way the film magazine can be loaded and unloaded easily and surely.

As is shown in FIG. 2, the plate spring 11 pushes the surface of the lower end of the film magazine 12 upwardly with no undesired effect upon the film unwinding efficiency. The spring like holding member is provided on the lower surface of the film magazine loading chamber at the side of the camera body so as to push the film magazine against the upper part of the loading chamber with a comparatively high frictional coefficient so that even when the back cover is opened rotation of the film magazine is prevented due to the spring effect of the film in the film magazine. Furthermore, it is possible to vertically position the film magazine and to faciliate stabilized positioning of the film magazine in the loading chamber.

For example in an automatic film loading camera, if the opening of the magazine through which the film is drawn out is rotated out of the determined position the end of the film leader is not positioned in a manner such that the film can not be set upon the feeding mechanism, which prevents speedy film loading. Further, in a camera in which the film can be wound up only after the back cover has been closed, when the end of the film leader is not positioned correctly the film is not engaged with the feeding mechanism properly, which prevents the film from being wound. On the other hand, the film magazine holding device in according with the present invention is particularly effective for an automatic film loading camera. Further, in the camera in which the film magazine is loaded without letting the rewinding fork escape along the axial direction the vertical positioning member of the film magazine is provided generally at the side of the back cover so that the vertical play in the film magazine loading chamber is unavoidably large. Therefore, it is difficult to effect vertical positioning of the film magazine with the back cover open. When the camera of the above-mentioned type is provided with a film magazine holding member in accordance with the present invention, it is possible to effect vertical positioning even with the back cover open in an effective manner.

Figure 5:
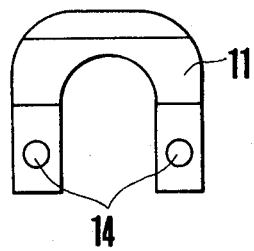
FIGS. 5(a) and (b) are views in elevation showing holding member shown in FIGS. 2 and 3 on the camera body.
Figure 5:
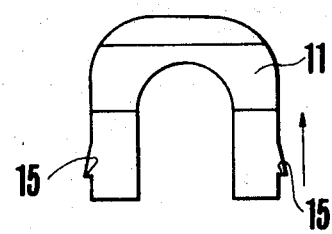

With reference to further embodiments of the invention, FIG. 5(a) shows the plate spring 11 caulked at 14, while FIG. 5(b) shows the plate spring 11 with projections 15 which are pushed in the direction of the arrow to mount the plate spring in the undercut portion of the film magazine loading chamber 10. Of course, many other methods are possible.

Figure 6:
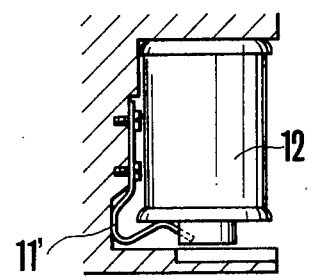
FIG. 6 is a side view of another embodiment of the present invention.
Figure 7:
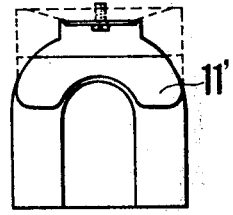
FIG. 7 is a plan view of the embodiment shown in FIG. 6.

FIGS. 6 and 7 show another embodiment of the present invention wherein the plate spring 11' is secured on the surface of the internal wall of the film magazine loading chamber 12 by appropriate means such as screws.

In all of the above-mentioned embodiments the surface of the lower end of the film magazine is pushed up by means of the film magazine holding member, whereby the surface of the upper end of the film magazine is urged upwardly.

As previously indicated, the invention makes it possible to prevent the film magazine from being rotated out of the determined position due to the spring effect of the film by means of the film magazine holding device. Furthermore, it is also possible to effect vertical positioning of the magazine. Consequently the film magazine holding device of the present invention is particularly suited for an automatic film loading camera or a camera in which the film magazine is loaded or unloaded without allowing the rewinding fork escape.

We claim:

1. A film magazine holding device for a camera comprising:
   a camera body including a back cover;
   a film magazine loading chamber provided on the camera body;
   film magazine holding means provided at one end of said film magazine chamber, said holding means having an end which is larger than the lower end of a film magazine which may be placed in said chamber, said holding means operating to push the loaded film magazine against the end of said film magazine chamber opposite said one end, whereby an opening in said film magazine through which film is drawn outwardly therefrom will not be rotated out of a predetermined position in the opened and the closed state of the back cover.

2. A film magazine holding device in accordance with claim 1, wherein said holding means comprise a U-shaped spring.

3. A film magazine holding device in accordance with claim 2, wherein said spring is mounted on the surface of said one end of said film magazine chamber.

4. A film magazine holding device in accordance with claim 2, wherein said spring is mounted on the surface of the internal wall of said magazine chamber.

5. A film magazine holding device for a camera comprising:
   a camera body including a back cover;
   a film magazine loading chamber provided in the camera body;
   spring means provided at one end of said film magazine loading chamber, said spring means having an end which is larger than the lower end of a film magazine which may be inserted in said chamber, said spring means operating to urge a loaded film magazine against an end of said film magazine loading chamber opposite said one end;
   a groove provided in the internal wall of said film magazine loading chamber at said one end thereof, whereby said end of said spring means is positioned in said groove;
   said device operating to prevent an opening in said film magazine through which film is drawn therefrom from being rotated out of a determined position in the opened and the closed state of the back cover.

* * * * *